United States Patent [19]
Bertozzi et al.

[11] 3,884,088
[45] May 20, 1975

[54] TIMER HAVING TWO SEPARATE CAM MEANS AND MEANS ADVANCING THE CAM MEANS AT DIFFERENT SPEEDS

[75] Inventors: Marcello Bertozzi; Mario Chioffi, both of Forsinone, Italy

[73] Assignee: P. R. Mallory & Co. Inc., Indianapolis, Ind.

[22] Filed: Dec. 3, 1973

[21] Appl. No.: 420,887

[30] Foreign Application Priority Data
Jan. 23, 1973  Italy.................................. 47857/73

[52] U.S. Cl....................................... 74/84; 74/435
[51] Int. Cl....................... F16h 27/04; F16h 55/04
[58] Field of Search................................ 74/435, 84

[56] References Cited
UNITED STATES PATENTS
3,443,442   5/1969   Schweihs............................. 74/84 R

*Primary Examiner*—Leonard H. Gerin
*Attorney, Agent, or Firm*—Hoffmann, Meyer & Hanson

[57] ABSTRACT

In the driving of two separate cam means, a speed reduction in a ratio greater than the ratio of the number of two teeth in two gears of a gear train is provided through the cooperation of gears, one having at least one tooth, the remainder being smooth, the other having teeth one half tooth out of phase with each other.

6 Claims, 5 Drawing Figures

PATENTED MAY 20 1975 3,884,088

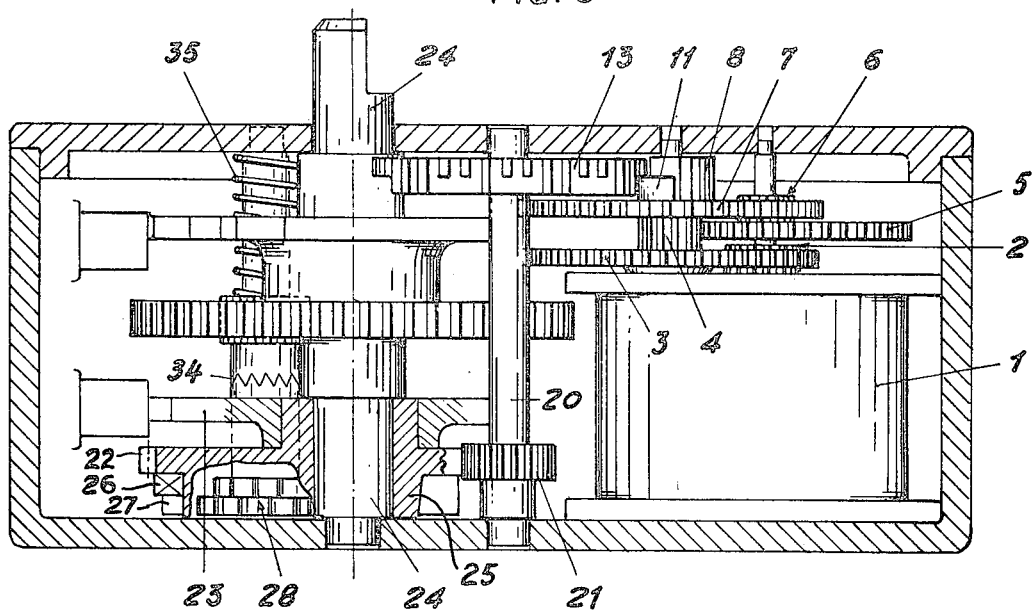
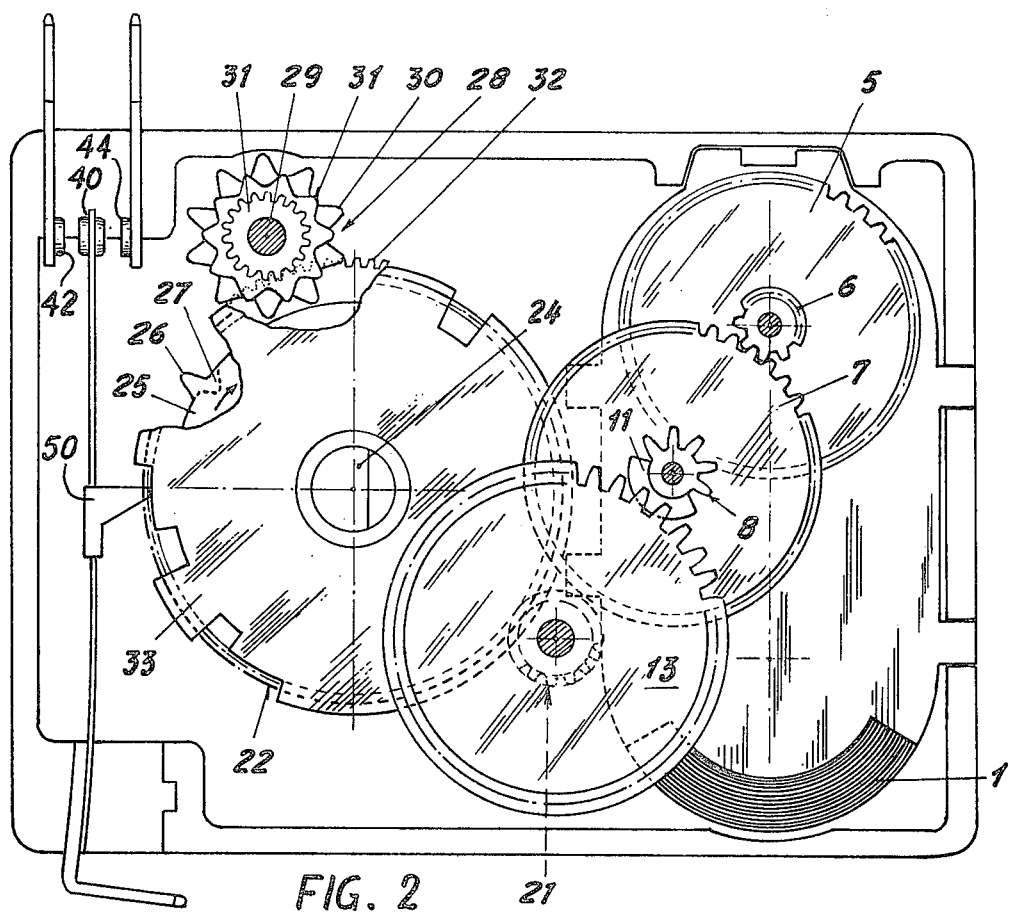

TIMER HAVING TWO SEPARATE CAM MEANS AND MEANS ADVANCING THE CAM MEANS AT DIFFERENT SPEEDS

Generally speaking the present invention relates to a timer which comprises an activating motor and gear system for the drive of a first and second cam means controlling, in a well known manner, the opening and closing of electrical contacts according to their profiles, characterized in that there is provided in its speed reduction gear train between the motor and the first cam means, a means of speed reduction in a ratio greater than the ratio of the number of teeth in two gears; a pinion having a cogged sector and a smooth sector and a gear having a cog system with teeth incised at intervals through a part of their vertical extension in which the teeth are distributed at intervals along the periphery of the gear, the arrangement being such that the smooth sector of the pinion, during its rotation, engages the teeth of the gear to stop the gears rotation; and further characterized in that the cogged sector successively advances the gear through a fraction of a revolution, thus obtaining a reduction in speed between the pinion and the gear greater than the ratio of the respective teeth; the gear being further arranged to drive the first cam means at a relatively high speed; a disc coupled to the first cam means, the disc having a smooth periphery, with at least one tooth extending from the smooth periphery a double rowel gear component the teeth of which are one half tooth out of phase, the first rowel gear of the double rowel gear engaging the smooth peripheral surface of the disc, the tooth engaging the second gear while the first meshes with a recess provided in the disc corresponding to the tooth, the double rowel gear component being coupled to a cog-wheel connected to the second cam means.

The present invention concerns an improvement in timers particularly adapted to domestic electrical appliances, such as clothes washers, dish washers and similar appliances.

The present invention concerns, in a more particular manner, a timer of the aforementioned type that is particularly compact and of economical construction. More particularly, the timer of the present invention utilizes a gear train which provides a speed reduction in ratio greater than the ratio of the number of teeth in two of its gears. This substantially reduces the number of required gears in the gear train.

Accordingly it is a feature of the present invention to provide a timer that is particularly compact and of economical construction. Another feature of the invention is the provision of a timer that utilizes a single gear train to rotate two separate cam means. A further feature of the invention is the provision of a timer that utilizes a gear train wherein a speed reduction in a ratio greater than the ratio of the number of teeth in two gears of the gear train is provided. These and other features of the invention will become apparent from the following description taken in conjunction with the accompanying drawings wherein:

FIG. 2 shows a lay-out view, partially broken off, of the timer shown in FIG. 1.

FIG. 3 shows a sectional view of the timer according to the invention.

Figure 1:
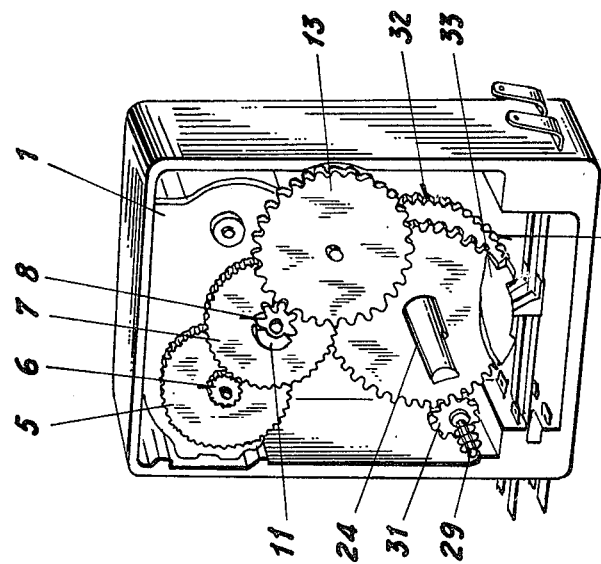
FIG. 1 shows a perspective view of the timer according to the invention with one wall removed to show its interior.

With reference to the drawings, and the particular to FIGS. 1 to 3, the timer comprises a synchronous motor 1, with a motor pinion 2 which engages a first reducer gear 3 jointly with a second pinion 4 which engages a cog-wheel 5 with a third pinion 6 which in turn, engages a cog-wheel 7.

Fitted onto the cog-wheel 7, is a component 8 bearing a tooth system 9 and a double cylindrical surface 10, 11 arranged to operate with tooth system 12 of gear 13, in the manner which will now be described.

Figure 4:
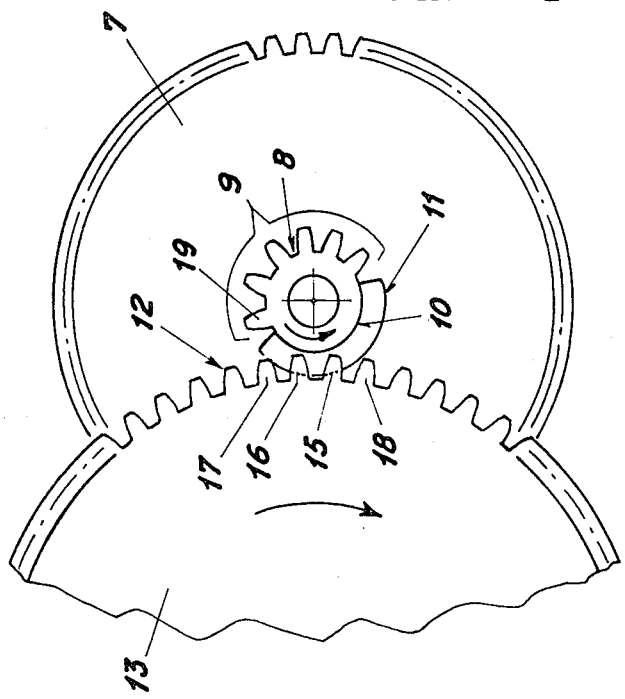
FIGS. 4 and 5 show a lay-out view and a rear view of one particular feature of the timer mechanisms.
Figure 5:
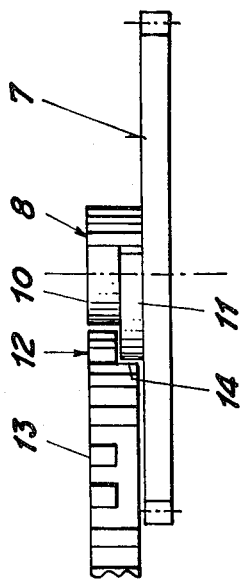

In the particular form under examination, the gear 13 bears a tooth system 12 in which the teeth are extended two by two throughout the entire width of the wheel and correspond substantially to the tooth system 9 of the component 8, and are incised at about half height down to the root of the tooth system 12 as shown at 14 in FIG. 5. Thus the condition is attained whereby, during the rotation of the component 8, the tooth system 9 engages the tooth system 12 through an approximate 180° rotation of the component 8 causing the wheel 13 to rotate through an angle corresponding to the number of teeth in the tooth system 9. This pulling action of the wheel 13, being completed, the cylindrical part 11 of the component 8 engages the hollowed out space 14 below two teeth, for example, the teeth 15 and 16, while the adjacent teeth 17, 18 of the entire width become engaged against the cylindrical surface 11. Thus the rotation of the wheel 13 comes to be temporarily impeded while the rotation of the wheel 7 continues. When the cylindrical sector 11 has completed the fraction of a revolution corresponding to its angular extension, the first tooth 19 of the tooth system 9 engages the whole tooth 17 of the wheel 13, pulling it through another fraction of a revolution. Thus there is obtained a very high reduction ratio between the number of revolutions of the wheel 7 and that of the wheel 13.

The wheel 13 is united with shaft 20 upon which is fixed pinion 21 which engages cog-wheel 22 to which is coupled a first cam pack 23, mounted to turn on a shaft 24 which extends to the outside of the timer.

The cog-wheel 22 is mechanically joined to a disc 25, bearing one or more teeth 26, each of which is connected with recess 27, which is slightly distorted with respect to the root of the tooth 26. The disc 25 operates in unison with a component 28 mounted to turn on the shaft 29 bearing two rowel cog components 30, 31 which carry the same number of teeth, but out of phase with each other by one step corresponding to a half tooth.

The ends of the gear teeth 30 rest against the smooth peripheral surface of the disc 25 to maintain the component 28 in position during the rotation of the disc 25. When the tooth 26 reaches the gear 31, the gear will rotate for a fraction of revolution, and a corresponding tooth of the gear 31 will enter simultaneously into recess 27 in order to permit the rotation of the element 28. When the tooth (or teeth) 26 has passed beyond the zone of interaction with the component 28, the component will remain in fixed position for the reasons expounded above. The component 28 is connected to pinion 31 which engages cog-wheel 32, jointly with a second cam pack 33, in turn also united to the shaft 24.

Advantageously, the pinion 31 can be connected to the component 28 through a coupling 34 with a sawtooth cog system maintained in position by spiral spring 35. This enables the rotation of the shaft 24 by means of a knob and thus enables the pre-arrangement of the cam pack 33 into any desired position. The cam packs 23, 33 activate, in the well known manner, contacts 40, 42 and 44 through movable contact blade 48 and follower 50 thus controlling the various electrical commutation functions required of the timer. With the precedingly described structure, the first cam pack 23 will rotate relatively rapidly, and the second cam pack 33 will rotate at a much lower speed (for example, one revolution every 15 hours).

What is claimed is:

1. A timer comprising:
   a. motor drive means
   b. a first cam means
   c. a first speed reduction gear system coupling said first cam means to said motor drive means,
   d. a second cam means, and
   e. a second speed reduction gear system coupling said second cam means to said first cam means,
   f. each of said speed reduction gear systems including means providing a speed reduction greater than the ratio of the number of teeth of two gears of said gear systems.

2. A timer according to claim 1 wherein one of said means providing a greater speed reduction comprises a pinion having a cogged sector and a smooth sector, a gear having teeth a portion of which are incised at intervals through about half their height, said pinion and gear cooperating such that said smooth sector engages said teeth to prevent said gears rotation, and said cogged section engaging said gear to provide for its rotation.

3. A timer according to claim 2 wherein said means providing a greater speed reduction is included in said first speed reduction gear system.

4. A timer according to claim 1 wherein one of said means providing a greater speed reduction comprises a disc having a smooth periphery a recess in said periphery and at least one tooth extending therefrom; a double rowel gear in which the teeth thereof are one half tooth out of phase with respect to each other, said disc and said double rowel gear cooperating such that upon rotation of said disc one of said rowel gears engages said smooth periphery, and said tooth engages the other rowel gear, further rotation of said disc causing said tooth to engage the other of said rowel gears while the first named rowel gear engages said recess; and a cog-wheel coupled between said double rowel gear and said second cam means.

5. A timer according to claim 4 wherein said means providing a greater speed reduction is included in said second speed reduction gear system.

6. A timer according to claim 1 wherein said first and second cam means are rotatably carried on a single shaft.

* * * * *